United States Patent Office 3,282,351
Patented Nov. 1, 1966

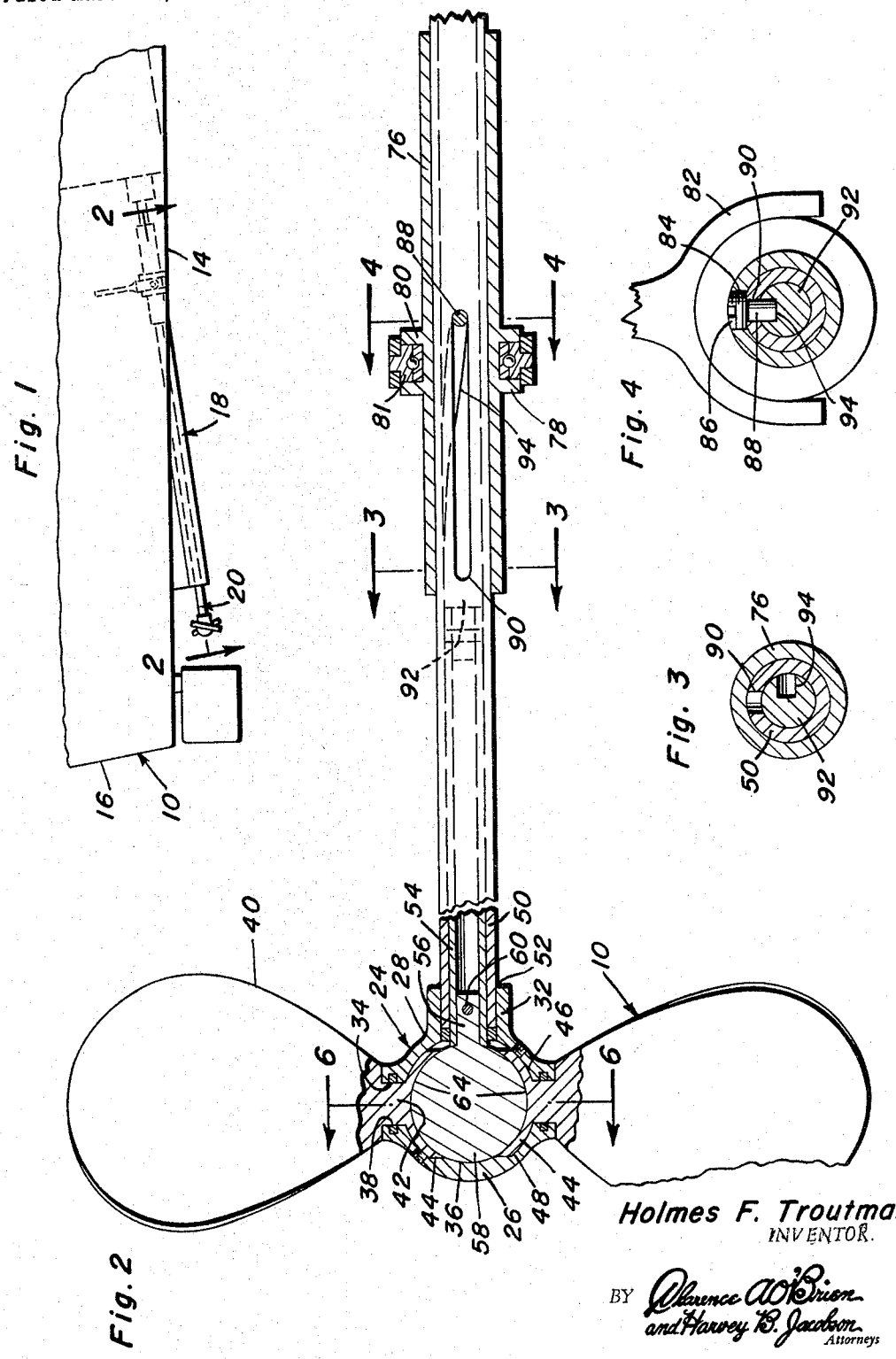

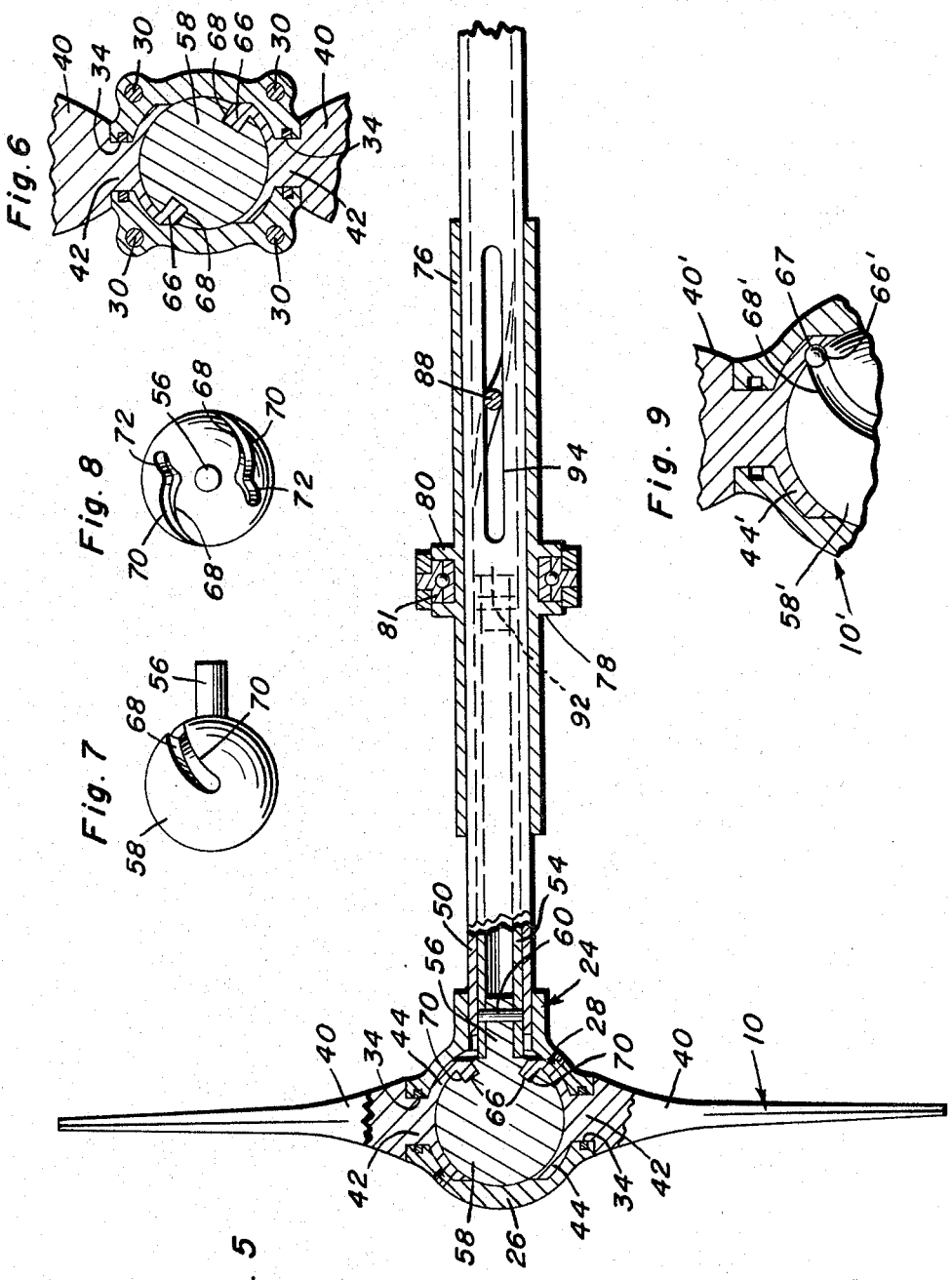

1

3,282,351
VARIABLE PITCH, REVERSING AND
FEATHERING PROPELLER
Holmes F. Troutman, 132 Cocoa Ave., Indialantic, Fla.
Filed Mar. 10, 1966, Ser. No. 533,369
17 Claims. (Cl. 170—160.44)

This invention relates to a variable pitch and reversing propeller and more specifically to a propeller including a hub portion provided with generally radially extending propeller blades mounted on the hub for rotation about the corresponding radii of the hub. Means is provided for interconnecting the blades so that they may be simultaneously rotatably adjustably positioned relative to the hub and the means interconnecting the blades includes structural features enabling the angular position of the blades to be adjusted from the interior of an associated boat and during rotation of the hub assembly of the propeller.

In addition, the variable pitch and reversing propeller of the instant invention includes a hub portion which is in the form of a hollow housing and which defines a generally spherical cavity including partial spherical inner surface portions spaced circumferentially about the longitudinal center axis of the housing. The partial spherical inner surface portions define portions of a spherical cavity which is of a greater diameter than the spherical cavity about which the partial spherical inner surface portions are disposed.

The housing further includes a journal neck portion having its longitudinal center axis coinciding with the longitudinal center axis of the housing. A tubular drive shaft is secured to the journal neck portion and may be utilized to rotatably support and drive the propeller. An actuating shaft is journalled through the tubular drive shaft and has a diametrically enlarged spherical bearing member mounted on the end thereof adjacent the housing and snugly and rotatably received within the smaller diameter spherical cavity within the housing.

The housing includes two half sections removably secured together and including opposing surfaces lying on a plane disposed normal to the longitudinal axis of said tubular drive shaft and a propeller blade is provided for each partial spherical inner surface portion including generally circular segments of a sphere on the radial innermost end portions snugly received between the aforementioned partial spherical inner surface portions and the confronting surface portions of the spherical member carried by the operating shaft. Each of the propeller blades also includes a shank portion immediately adjacent the generally circular hollow spherical segment thereof and each shank portion is rotatably received through a corresponding generally radial bore formed in the corresponding portions of the housing. In this manner, the spherical shell segments carried by the radial innermost ends of the propeller blades are oscillatably received between the confronting surfaces of the spherical member carried by the operating shaft and the corresponding partial inner spherical surface portions of the housing.

The spherical shell segments carried by the base ends of the propeller blades include inwardly projecting actuating pins eccentrically located relative to the corresponding shank portions and the spherical member carried by the operating shaft and disposed within the housing includes outwardly opening peripheral grooves in which the pins are slidingly received and which include longitudinal configurations for shifting the propeller blades between corresponding full feathered positions, positive pitch positions, neutral pitch positions and negative pitch positions in response to rotation of the operating shaft in one direction relative to the tubular drive shaft.

The main object of this invention is to provide a propeller including structural features oscillatably supporting the propeller blades of the propeller assembly from the hub portion thereof for movement between positive, neutral and negative pitch positions.

A further object of this invention is to provide a marine propeller assembly in accordance with the preceding object including means by which the individual propeller blades thereof may have their pitch simultaneously adjusted by means of a single actuator and during rotation of the propeller assembly.

Still another object of this invention is to provide a marine propeller assembly in accordance with the preceding objects and including structural features enabling the propeller blades to be readily individually or collectively replaced or removed for repair.

A further object of this invention is to provide a variable pitch marine propeller assembly including novel bearing means for oscillatably supporting the base ends of the propeller ends from the hub portion thereof.

A final object of this invention to be specifically enumerated herein is to provide a marine propeller assembly in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of an inboard motor boat shown equipped with the variable pitch and reversing propeller assembly of the instant invention;

FIGURE 2 is an enlarged side elevational view of the propeller assembly of the instant invention with portions thereof being broken away and shown in longitudinal vertical section;

FIGURE 3 is an enlarged transverse sectional view taken substantially upon the plane indicated by the section line 3—3 of FIGURE 2;

FIGURE 4 is an enlarged fragmentary transverse sectional view taken substantially upon the plane indicated by the section line 4—4 of FIGURE 2;

FIGURE 5 is a side elevational view similar to FIGURE 2 but showing the propeller blades in neutral pitch positions;

FIGURE 6 is a fragmentary transverse sectional view taken substantially upon the plane indicated by the section line 6—6 of FIGURE 2;

FIGURE 7 is a side elevational view of the spherical bearing member for the blades of the propeller assembly;

FIGURE 8 is an end elevational view of the bearing member as seen from the right side of FIGURE 7; and FIGURE 9 is a fragmentary enlarged longitudinal vertical sectional view of the hub portion of the propeller assembly and showing a modified form of construction.

Referring now more specifically to the drawings, the numeral 10 generally designates a boat hull including a bottom 14 and a transom 16. The boat hull 10 includes a bearing assembly generally referred to by the reference numeral 18 through which a portion of the propeller assembly of the instant invention which is generally designated by the reference numeral 20 is journalled.

With reference now more specifically to FIGURES 2–8 of the drawings, it may be seen that the propeller assembly 10 includes a housing or hub portion generally referred to by the reference numeral 24 defined by a pair of housing half sections 26 and 28 secured together by means of a plurality of fasteners 30. The housing 24 includes a hollow neck portion 32 and the confronting surfaces of the housing halves 26 and 28 lie upon a plane disposed substantially normal to the longitudinal center axis of the neck portion 32. Suitable seal means (not shown) may be disposed between the confronting surfaces of the housing halves 26 and 28. Further, the housing 24 includes a plurality of journal bores 34 which extend generally radially of the generally spherical cavity 36 defined by the housing 24 and which are bisected by the plane in which the confronting surfaces of the housing halves 26 and 28 are disposed, which plane also bisects the spherical cavity 36. The bores 34 include seal means 38 and a pair of propeller blades 40 have their generally cylindrical shank portions 42 rotatably received through the bores 34. The radial innermost ends of the propeller blades 40 include spherical shell segments 44 which are generally circular in plan, and whose convex surfaces 46 are snugly and seatingly received in partial spherical inner surface portions 48 defined by recesses in the housing halves 26 and 28 also bisected by the aforementioned plane.

The cylindrical neck portion 32 has one end of a tubular drive shaft 50 secured therein in any convenient manner such as by welding 52 and a tubular operating shaft 54 is journaled in the tubular drive shaft 50 and has one end thereof projecting into the cavity 36. The end of the operating shaft 54 projecting into the cavity 36 has a mounting neck portion 56 of a spherical bearing member 58 removably secured therein by means of a pin 60 secured through the neck portion 56 and diametrically through the tubular operating shaft 54. The spherical member 58 is snugly and seatingly received in the cavity 36 defined by the housing 24, the cavity 36 being smaller in diameter than the cavity defined by the partial spherical inner surface portions 44 and the concave spherical surfaces 64 of the spherical shell segments 44 form continuations of the cavity 36.

With attention now invited to FIGURES 5–8 of the drawings it may be seen that each of the spherical shell segments 44 includes an operating pin 66 which projects inwardly from the concave spherical surface 64 thereof and which is seated in a corresponding groove 68 formed in the spherical member 58. Each of the grooves 68 includes a pair of communicated groove sections 70 and 72 which are arcuate in configuration and it is believed that it will be readily apparent from a comparison of FIGURES 2 and 5–8 of the drawings that the propeller blades are rotated to zero pitch positions in FIGURE 5 and forward positive pitch positions in FIGURE 1 of the drawings. In these two positions of angular adjustment of the propeller blades 40 the pins 66 are disposed at the closed ends of the sections 70 and at the mid portions of the groove sections 70, respectively. Of course, should the operating shaft 60 be rotated so as to position the pins 60 at the intersections of the sections 70 and 72 and thereafter to the closed ends of the groove sections 72 remote from the groove sections 70, the blades 40 would then be disposed in neutral and thereafter reverse or negative pitch positions, respectively.

The tubular drive shaft 50 extends through the bearing assembly 18 and has an actuating sleeve 76 mounted thereon for rotation therewith and shifting longitudinally thereof. The actuating sleeve 76 includes a pair of longitudinally spaced radially outwardly projecting annular flanges 78 and 80 between which a bearing assembly 80 is received. The bearing assembly 80 is engaged by a shifting fork 82 which may be held against rotation with the drive shaft 50 and shifted axially of the latter in order to cause the actuating sleeve 76 to be shifted axially of the drive shaft 50.

The sleeve 76 is provided with a threaded radial bore 84 in which the diametrically enlarged and externally threaded outer end portion 86 of an actuating pin 88 is threadedly engaged. The drive shaft 50 has a longitudinal slot 90 formed therein and the solid portion 92 of the actuating shaft 54 has a helical groove 94 formed therein in which the inner end of the pin 88 is seated. The solid portion 92 of the actuating shaft 54 is pinned to the tubular portion of the actuating shaft 54 as at 94 and it may therefore be seen that axial shifting of the actuating sleeve 76 will cause the pin 88 to be shifted longitudinally of the drive shaft 50 while being maintained against rotation relative thereto about the longitudinal axis of the latter and thereby cause the solid portion 92 of the actuating shaft 54 to be rotated relative to the drive shaft 50. In this manner, the spherical member secured to the rear end of the actuating shaft 54 may be caused to rotate about the longitudinal axis of the neck portion 32 and the pins 66 carried by the blades 40 to be swung about the longitudinal axes of the shank portions 42.

With attention now invited to FIGURE 9 of the drawings there will be seen a modified form of propeller assembly which is substantially identical in construction to the propeller 10 but which includes grooves 68' in the spherical member 58' thereof which are generally semi-circular in cross section and in which generally spherical followers 66' corresponding to the pins 66 are seated, the spherical followers 66' being also seated in inwardly opening partial spherical recesses 67 formed in the spherical shell segments 44' of the propeller blades 40'. Therefore, it may be seen that the propeller generally referred to by the reference numeral 10' and illustrated in FIGURE 9 of the drawings operates in the same manner as the propeller 10.

The propellers 10 and 10' may each have any desired number of blades. Further, it will be noted that the portions of the grooves 68 and 68' with which the followers 66 and 66' are engaged, except when the corresponding blades are in their neutral positions, are disposed generally normal to the direction in which the corresponding followers are swung to shift said blades from the neutral positions. Thus, the blades tend to remain in their adjusted positions once they are adjusted as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A propeller with adjustable pitch blades, said propeller including a hollow hub or housing defining a small diameter and generally spherical cavity and a hollow journal neck portion opening into said cavity with the center of said cavity lying on the longitudinal center axis of said neck portion, said housing also including a plurality of circumferentially spaced radial bores opening through the walls of and inwardly of said housing and disposed generally normal to said center axis, said housing including inwardly facing recessed inner thrust bearing surface portions disposed about each of the inner ends of said bores, a plurality of generally radially extending blade members each including an inner end shank portion journalled in the corresponding bore and an inner diametrically enlarged base portion including outwardly facing bearing surface portions mating with the corresponding thrust bearing surfaces, the inner ends of said base portions defining partial concave spherical surfaces, each having the center of said cavity as the center of its curvature, an operating shaft journalled through said journal neck portion and including an enlarged head portion on its inner end including convex spherical surface bearing portions complementary to and engaged with at least portions of the surfaces of said housing defining said cavity and at least portions of said partial concave spherical surfaces, said base portions and said head portion including coacting means operable, in response to rotation of said head portion about said center axis relative to said housing, to simultaneously adjustably rotate said shank portions in said bores.

2. The combination of claim 1 wherein said neck portion has one end of a tubular drive shaft secured therein, said operating shaft being journalled through said drive shaft.

3. The combination of claim 1 wherein said radial bores lie in a plane passing through said center of said cavity and disposed normal to said center axis.

4. The combination of claim 3 wherein said housing is constructed of two housing halves including mating abutting surfaces lying on said plane and means for securing said half sections together.

5. The combination of claim 1 wherein said housing and said shank portions include coacting seal means defining a fluid tight seal between said shank portions and said housing.

6. The combination of claim 1 wherein coacting means include generally radially inwardly projecting portions carried by said base portions and circumferentially extending and outwardly opening arcuate grooves in said head portion in which said inwardly projecting portions are received for movement longitudinally therealong upon rotation of said head portion relative to said housing.

7. The combination of claim 6 wherein said inwardly projecting portions comprise guide pins fixed in position relative to said base portions.

8. The combination of claim 1 wherein coacting means include generally radially inwardly projecting portions carried by said base portions and circumferentially extending and outwardly opening arcuate grooves in said head portion in which said inwardly projecting portions are received for movement longitudinally therealong upon rotation of said head portion relative to said housing, said inwardly projecting portions comprising spring urged detent members seatingly received in said grooves.

9. The combination of claim 1 wherein said coacting means include outwardly projecting guide members and complementary arcuate grooves on said head and base portions, said guide members being guidingly received in said grooves for movement therealong upon rotation of said head portions relative to said housing.

10. The combination of claim 1 wherein said neck portion has one end of a tubular drive shaft secured therein, said operating shaft being journalled through said drive shaft, said operating shaft having an operating sleeve axially slidable thereon, said drive shaft having a radial and longitudinally extending slot formed therein, said operating shaft having a helical groove formed therein registered with said slot, and said operating sleeve including inwardly projecting pin means extending through said longitudinally extending slot and projecting into and slidably received in said helical slot.

11. The combination of claim 10 wherein said radial bores lie in a plane passing through said center of said cavity and disposed normal to said center axis, said housing being constructed of two housing halves including mating abutting surfaces lying on said plane, and means for securing said half sections together.

12. The combination of claim 1 wherein said neck portion has one end of a tubular drive shaft secured therein, said operating shaft being journalled through said drive shaft, said operating shaft having an operating sleeve axially slidable thereon, said drive shaft having a radial and longitudinally extending slot formed therein, said operating shaft having a helical groove formed therein registered with said slot, and said operating sleeve including inwardly projecting pin means extending through said longitudinally extending slot and projecting into and slidably received in said helical slot, said housing and said shank portions including coacting seal means defining a fluid tight seal between said shank portions and said housing.

13. The combination of claim 1 wherein said neck portion has one end of a tubular drive shaft secured therein, said operating shaft being journalled through said drive shaft, said operating shaft having an operating sleeve axially slidable thereon, said drive shaft having a radial and longitudinally extending slot formed therein, said operating shaft having a helical groove formed therein registered with said slot, and said operating sleeve including inwardly projecting pin means extending through said longitudinally extending slot and projecting into and slidably received in said helical slot, coacting means including generally radially inwardly projecting portions carried by said base portions and circumferentially extending and outwardly opening arcuate grooves in said head portion in which said inwardly projecting portions are received for movement longitudinally therealong upon rotation of said head portion relative to said housing.

14. The combination of claim 1 wherein said coacting means include outwardly projecting guide members and complementary arcuate grooves on said head and base portions, said guide members being guidingly received in said grooves for movement therealong upon rotation of said head portions relative to said housing, said neck portion having one end of a tubular drive shaft secured therein, said operating shaft being journalled through said drive shaft, said operating shaft having an operating sleeve axially slidable thereon, said drive shaft having a radial and longitudinally extending slot formed therein, said operating shaft having a helical groove formed therein registered with said slot, and said operating sleeve including inwardly projecting pin means extending through said longitudinally extending slot and projecting into and slidably received in said helical slot.

15. The combination of claim 14 wherein said housing is constructed of two housing halves including mating abutting surfaces lying on said plane, and means for securing said half sections together.

16. The combination of claim 1 wherein coacting means include generally radially inwardly projecting portions carried by said base portions and circumferentially extending and outwardly opening arcuate grooves in said head portion in which said inwardly projecting portions are received for movement longitudinally therealong upon rotation of said head portion relative to said housing, said neck portion having one end of a tubular drive shaft secured therein, said operating shaft being journalled through said drive shaft, said operating shaft having an operating sleeve axially slidable thereon, said drive shaft having a radially and longitudinally extending slot formed therein, said operating shaft having a helical groove formed therein registered with said slot, and said operating sleeve including inwardly projecting pin means extending through said longitudinally extending slot and projecting into and slidably received in said helical slot, said inwardly projecting portions comprising guide pins fixed in position relative to said base portions.

17. The combination of claim 1 wherein coacting means include generally radially inwardly projecting portions carried by said base portions and circumferentially extending and outwardly opening arcuate grooves in said head portion in which said inwardly projecting portions are received for movement longitudinally therealong upon rotation of said head portion relative to said housing, said neck portion having one end of a tubular drive shaft secured therein, said operating shaft being journalled through said drive shaft, said operating shaft having an operating sleeve axially slidable thereon, said drive shaft having a radial and longitudinally extending slot formed therein, said operating shaft having a helical groove formed therein registered with said slot, and said operating sleeve including inwardly projecting pin means extending through said longitudinally extending slot and projecting into and slidably received in said helical slot, said inwardly projecting portions comprising spring urged detent members seatingly received in said grooves.

No references cited.

MARTIN P. SCHWADRON, *Primary Examiner.*

E. A. POWELL, JR., *Assistant Examiner.*